July 11, 1950 S. M. WEISBERG 2,515,105
METHOD OF MAKING AN ELECTRICAL CONNECTION
TO AN INSULATED WIRE
Filed Aug. 8, 1947 3 Sheets-Sheet 1

Sidney M. Weisberg
INVENTOR.

BY
*Philip S. McBean*
ATTORNEY.

July 11, 1950
S. M. WEISBERG
2,515,105
METHOD OF MAKING AN ELECTRICAL CONNECTION TO AN INSULATED WIRE
Filed Aug. 8, 1947
3 Sheets-Sheet 2
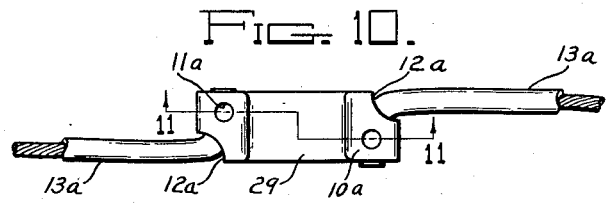
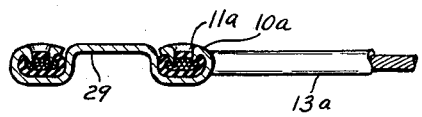
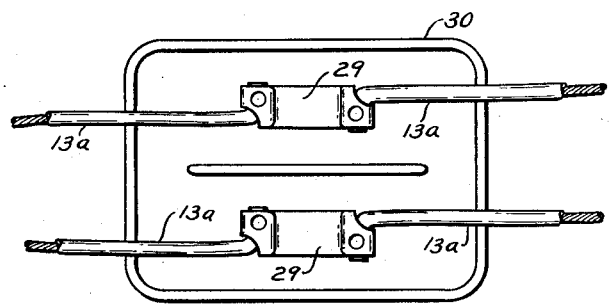
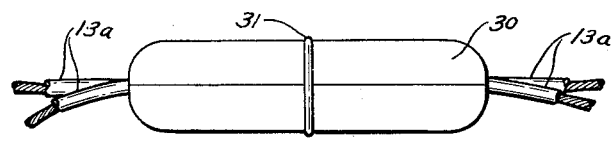
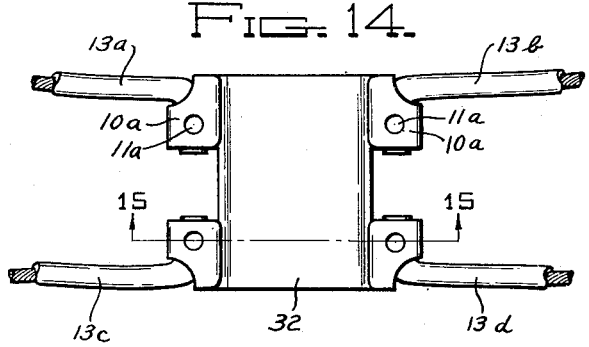
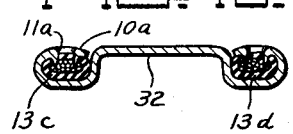
SIDNEY M. WEISBERG
INVENTOR.
BY Philip S. McLean
ATTORNEY.

July 11, 1950  S. M. WEISBERG  2,515,105
METHOD OF MAKING AN ELECTRICAL CONNECTION
TO AN INSULATED WIRE
Filed Aug. 8, 1947  3 Sheets-Sheet 3

SIDNEY M. WEISBERG
INVENTOR.

BY Philip S. McLean
ATTORNEY.

Patented July 11, 1950

2,515,105

UNITED STATES PATENT OFFICE 2,515,105

METHOD OF MAKING AN ELECTRICAL CONNECTION TO AN INSULATED WIRE

Sidney M. Weisberg, Newark, N. J., assignor to Allied Electric Products, Inc., Irvington, N. J., a corporation of New Jersey Application August 8, 1947, Serial No. 767,575

1 Claim. (Cl. 29—155.55)

The invention of this patent application relates to attachment plugs and aims to provide a blade construction which will eliminate the need for soldering of wires and, in some instances, the need for stripping the wires of insulation. This invention is related to that disclosed in copending application of even date, Serial No. 767,576, now abandoned.

Particularly it is a purpose of the invention to provide a structure enabling the wires to be both electrically and mechanically connected with the blades, quickly and easily and without special preliminary preparation of the wires or the blades.

Special objects are to accomplish these and other desired results with no increase in expense and, actually, at lower cost.

In line with all such objects, it is a purpose of the invention to effect the securing of the wires to the blades firmly and permanently, with a strain relief effect and without adding to the bulk or size of the blades or the complete plug.

Other desirable objects and the novel features through which the purposes of the invention are attained are set forth or will appear in the course of the following specification.

The drawing accompanying and forming part of the specification illustrates certain present practical embodiments of the invention. Structure, however, may be further modified as regards the immediate illustration, all within the true intent and broad scope of the invention as hereinafter defined and claimed.

Fig. 1 in the drawing is a perspective view showing one of the attachment plug blades with the end portion of an insulated wire ready to be electrically and mechanically united therewith;

Fig. 10 is a plan view showing how the principle of the invention may be applied to connecting a pair of wires;

Fig. 11 is a sectional view as on substantially the plane of line 11—11 of Fig. 10;

Fig. 12 is a plan view showing a pair of the connectors in use for completing two different lines of wiring and how such connectors may be protected within a casing, the upper half of the casing being removed in this view;

Fig. 13 is an edge view showing the complete casing enclosing the connected wires;

Fig. 14 is a plan view showing a form of connector for two, three or four wires;

Fig. 15 is a cross sectional view as on substantially the plane of line 15—15 of Fig. 14;

Figure 1:
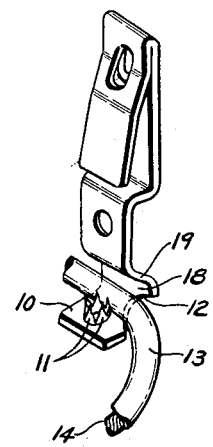

In Fig. 1 there is shown an attachment plug blade of the "spring action" type but differing from such blades as heretofore constructed in having an angled step 10 at the lower or inner end thereof, provided with a circular, jagged row of sharp teeth 11.

This terminal blade is unusual also in that it has a notch 12 in the side edge of the same, above and partly in the angled step.

This notch 12 forms a hollow for reception of the insulation 13 of the wire 14.

Figure 2:
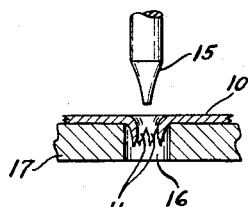
Fig. 2 is a broken sectional detail illustrating the operation of forming the blade with sharp, rigid, projecting teeth for penetrating the insulation and biting into the strands of the wire.

Fig. 2 illustrates one simple and effective way of forming the upstanding row of teeth 11 on the angled end of the blade, that is, by means of a tapered punch 15 operating to pierce and to draw the metal of the blade into the opening 16 in a die 17.

A die such as illustrated tapers and tears the flange of drawn metal about the opening into an irregular set of sharp, tapered teeth or points such as shown. The annular form gives these teeth a certain rigidity, strength and stiffness, enabling them to readily cut through the various kinds of insulation ordinarily employed with attachment plugs. This includes the "plastic" insulations as well as the ordinary rubber, cotton and other more familiar insulations used on attachment plug wires.

Fig. 1 shows how the wire, without removal of any insulation, may be placed on the step 10 in back of the ring of teeth and with the latter serving thus to retain the wire in place against the back wall 18 and shoulder 19 of the blade.

Figure 3:
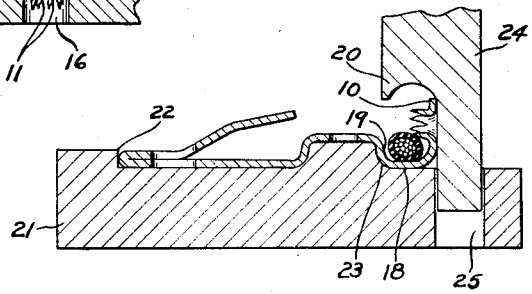
Fig. 3 is a broken sectional view showing a form of die for rolling the toothed end of the blade about the insulated wire.

Fig. 3 shows how, with the wire so retained by the teeth against the angularly related back wall portion 18 and shoulder 19, a curling tool 20 may be employed to roll the toothed end of the blade over the wire.

The closing tool, as indicated in Fig. 3, may be in the nature of a rest or base 21, having cavities 22 and 23 to accommodate the opposite end portions of the blade and a punch 24 guided down through the base at 25 and carrying the rolling or bending die portion 26.

Figure 4:
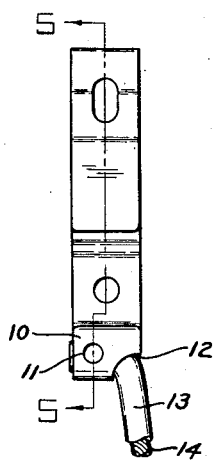
Fig. 4 is an elevation of the blade showing the wire connected therewith, the wire being broken away.

Fig. 4 shows the angled end portion 10 of the blade completely rolled about the end of the wire, with the circular row of teeth at 11 impressed into and forced through the insulation into the stranded body of the wire.

Figure 5:
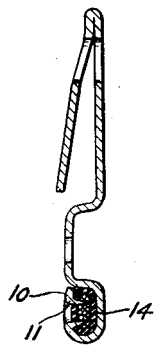
Fig. 5 is a cross sectional view as on substantially the plane of line 5—5 of Fig. 4.

Fig. 5 brings this out even more clearly, showing how the circular series of teeth actually fully and firmly penetrate and bite into the strands of the wire.

When the toothed angled end of the blade is rolled over the end of the wire, that portion immediately adjoining the end is left free in the notch 12 and therefore can be bent, as shown in Fig. 4, into a position substantially in alignment with the edge of the blade. This bending provides a strain relief and it locates the wire substantially within the boundary lines of the blade so that it will not project and will not form a bump on the side of a rubber plug cap in which such blades are regularly used.

Figure 6:
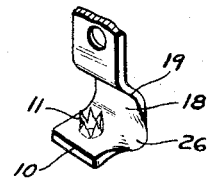
Fig. 6 is a broken perspective view of a modification.

Fig. 6 illustrates a modification in which the side edge of the blade, instead of being notched to provide the wire escape and strain relief, is bent out and thinned to form a lip 26 of the same general effect as the notch but leaving the blade somewhat stronger and providing a support for the wire at the strain relief bend.

While for all general purposes the sharp spurs or teeth 11 provide ample contact area between the blade and wire, there may be instances where it is desirable to provide surface engagement between the bare wire and the surface of the blade.

Figure 7:
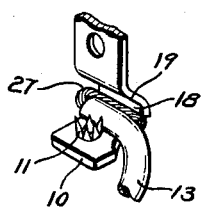
Figs. 7 and 8 are broken and part sectional views illustrating another modification, Fig. 8 being on a larger scale than the other views.
Figure 8:
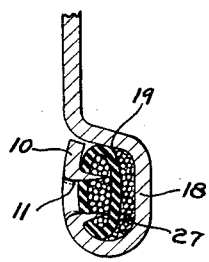

Such a condition is shown in Fig. 7, where the end of the wire is bared and doubled back, as indicated at 27, to lie against the back wall portion 18, against which it will be clamped when the toothed end portion 10 of the blade is rolled over, as shown in a larger scale in Fig. 8.

Blades provided with the toothed angled ends and notched or flanged edges can be produced at low cost and they carry in and of themselves integral wire receiving and attaching means.

While a simple form of die mechanism such as illustrated in Fig. 3 may be preferred generally for closing the toothed portion of the blade over the wire, it is contemplated that such a closing die may be incorporated in a pliers construction or the like. Structure, however, is such that this closing and connecting of the blade to the wire may be accomplished with an ordinary pair of pliers, or even with a hammer or other simple form of tool.

The invention, while largely eliminating the need for soldering, does not prevent soldering of the wire to the blade or connector strip if such is desired. In Fig. 7 the bared end portion 27 of the wire may be soldered in the seat 18, 19, before the securing portion 10 is bent over the same.

Figure 9:
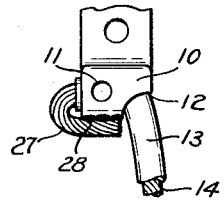
Fig. 9 is a broken front elevation to show how, if desired, a bared end portion of the wire may be soldered to the metal strip.

As an alternative, the bared end portion 27 of the wire may be brought out and then soldered over the outside of the strip, as indicated at 28 in Fig. 9.

While particularly useful for securing the wires to attachment plug blades, it will be evident from the foregoing that the invention may be employed with advantage in electrical connectors generally.

Such a connector is represented at 29, Figs. 10 and 11, in the form of a strip having bendable end lugs 10a at the opposite ends, with a circular series of spurs, teeth or prongs 11a to bite into and through the insulation of the wires 13a which are to be connected.

Fig. 10 shows the clearance notches 12a disposed diagonally opposite in the opposite ends of the strip so as to more or less balance the pull of the connected wires on the strip.

Figs. 12 and 13 show how after being connected by the strip connectors 29, they, the wire ends and connectors may be enclosed within a two-part case 30 of insulating or other material, with the parts suitably secured together as by means of an encircling ring, band or wire 31.

Figs. 14 and 15 show how the invention may be carried out in a connector for any number of wires. In this particular instance the sheet metal connector strip 32 is of generally rectangular shape and with the barbed, bendable lugs or tongues 10a at all four corners of the same so that it may be used for connecting one wire such as 13a to one, two or three other wires such as 13b, 13c, 13d.

The connectors last described, like the attachment blade form of connectors, may be used with or without soldering the wires, as circumstances may dictate.

Figure 16:
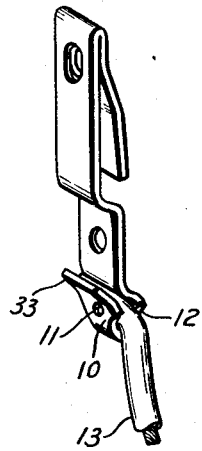
Fig. 16 is a perspective view of a modified form of attachment blade construction.
Figure 17:
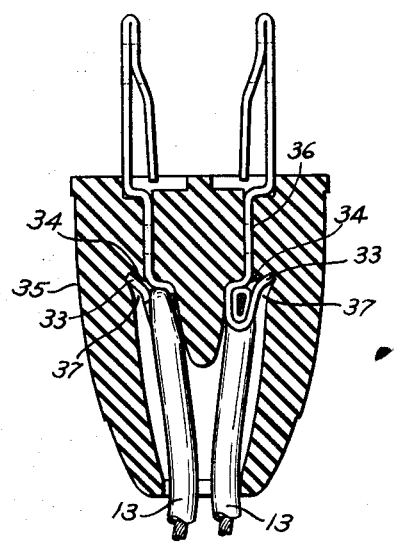
Fig. 17 is a broken sectional view showing these blades mounted in a plug body.

Figs. 16 and 17 show how, when the invention is embodied in a plug blade, the wire clamping loop at the inner end of the blade may be extended and curved reversely to form an outwardly projecting hook 33 for interlocking engagement behind the shoulder 34 provided in the plug body 35 at the inner end of the blade receiving passage 36.

The plug body shown is of rubber or plastic soft enough to permit the blades being pulled into place.

The engagement of the out-turned hook ends 33 behind the shoulders 34 limits the movement of pulling the blades into fully seated position in the plug body and prevents them from afterward being pulled out or becoming loose in the plug body. This construction enables the completed plugs to withstand the usual pull tests and the like to which such plugs are subjected. The outward projections 33 at the ends of the wire encircling loops, by pressure against the enclosing walls 37 of the wire cavity in the plug body, causes the loops to be held closed, all the more firmly over the wires with the sharp spurs 11 on these loops biting the more firmly into the wires.

In the construction shown in Figs. 16 and 17 the blades may be all alike, so that when reversed, as they are in the seated relation in the plug, Fig. 17, the two wires will come out at the opposite sides of the blades to substantially balance the pull on the plug.

What is claimed is:

The herein disclosed method of electrically connecting the conducting core and mechanically interlocking both the conducting core and the surrounding insulation of an insulated wire with an electrical connector and which comprises transversely bending the end portion of a sheet metal strip into a transversely extending open wire receiving groove and the end of the strip projecting substantially at a right angle from said groove and piercing and drawing said angularly extending end of the strip toward the side of the strip in which the groove is formed into an annular series of irregular, sharply pointed, tapered, sharp edged spurs projecting from the face of the strip, locating an insulated wire in said groove and in position between the formation of said groove and said projecting spurs and then bending the angularly extending end of the strip carrying said projecting spurs inwardly of the strip over said wire and driving said spurs through the insulation of the wire and into the conducting core of the wire.

SIDNEY M. WEISBERG.

REFERENCES CITED

The following references are of record in the file of this patent:

UNITED STATES PATENTS

| Number | Name | Date |
|---|---|---|
| 899,708 | Ball | Sept. 29, 1908 |
| 1,706,005 | Thompson | Mar. 19, 1929 |
| 1,762,848 | Whisler | June 10, 1930 |
| 1,956,018 | Gilbert | Apr. 24, 1934 |
| 2,044,182 | Arey | June 11, 1935 |
| 2,169,593 | Popp | Aug. 15, 1939 |
| 2,175,844 | Laystrom | Oct. 10, 1939 |
| 2,292,049 | Chirelstein | Aug. 4, 1942 |
| 2,309,311 | Grohsgal | Jan. 26, 1943 |
| 2,333,152 | Chirelstein | Nov. 2, 1943 |
| 2,433,384 | McLarn | Dec. 30, 1947 |

FOREIGN PATENTS

| Number | Country | Date |
|---|---|---|
| 5,585 | Great Britain | 1894 |